United States Patent
Zhang et al.

(10) Patent No.: US 8,121,128 B2
(45) Date of Patent: Feb. 21, 2012

(54) METHOD AND APPARATUS FOR LINK CONTROL IN A WIRELESS COMMUNICATION SYSTEM

(75) Inventors: Danlu Zhang, San Diego, CA (US); Mehmet Yavuz, San Diego, CA (US); Bibhu P. Mohanty, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 12/392,765

(22) Filed: Feb. 25, 2009

(65) Prior Publication Data

US 2009/0213729 A1 Aug. 27, 2009

Related U.S. Application Data

(60) Provisional application No. 61/031,612, filed on Feb. 26, 2008, provisional application No. 61/075,452, filed on Jun. 25, 2008.

(51) Int. Cl.
H04L 12/56 (2006.01)

(52) U.S. Cl. .................................. 370/395.4; 370/235

(58) Field of Classification Search .................. 370/231, 370/328, 349, 389, 394, 395.42, 437, 464, 370/473
See application file for complete search history.

(56) References Cited

U.S. PATENT DOCUMENTS

| | | | |
|---|---|---|---|
| 5,872,777 A * | 2/1999 | Brailean et al. | 370/349 |
| 2002/0016659 A1 | 2/2002 | Tashiro et al. | |
| 2002/0021700 A1 * | 2/2002 | Hata et al. | 370/395.42 |
| 2006/0187955 A1 * | 8/2006 | Rezaiifar et al. | 370/464 |

OTHER PUBLICATIONS

3GPP TS 25.322 V7.5.0 (Dec. 2007), 3rd Generation Partnership Project; Technical Specification Group Radio Access Network; Radio Link Control (RLC) protocol specification (Release 7).
Anand J, et al: "Architecture, implementation, and evaluation of a concurrent multi-path real-time transport control protocol," Military Communications Conference, 2007. MILCOM 2007. IEEE. IEEE, Piscataway, NJ, USA, Oct. 29, 2007, pp. 1-7, XP031232821, Introduction sections II.A and II.B.
Dong, Yu, et al: "A concurrent transmission control protocol," Communications, Circuits, and Systems Proceedings, 2006 International Conference on, IEEE, PI, Jun. 1, 2006, pp. 1796-1800, XP031010769, abstract, section II.
International Search Report and Written Opinion—PCT/US2009/035341, International Searching Authority—European Patent Office, Aug. 3, 2009.

* cited by examiner

*Primary Examiner* — Andrew Lai
(74) *Attorney, Agent, or Firm* — Charles Chesney

(57) ABSTRACT

Techniques for controlling transmission of packets on multiple links are described. In one design, a transmitter may generate packets of data for a receiver, assign the packets with sequence numbers from a single sequence number space, demultiplex the packets into multiple streams for multiple links, and send each stream of packets on the associated link to the receiver. The receiver may receive some packets in error, and the correctly received packets may be out of order. In one design, the receiver may maintain the largest sequence number of correctly received packets for each link. After detecting at least one missing packet, the receiver may send status information conveying the missing packet(s) and the largest sequence numbers for all links to the transmitter. The transmitter may use the largest sequence numbers for all links and its packet-to-link mapping to determine whether to quickly resend each missing packet or wait.

37 Claims, 7 Drawing Sheets

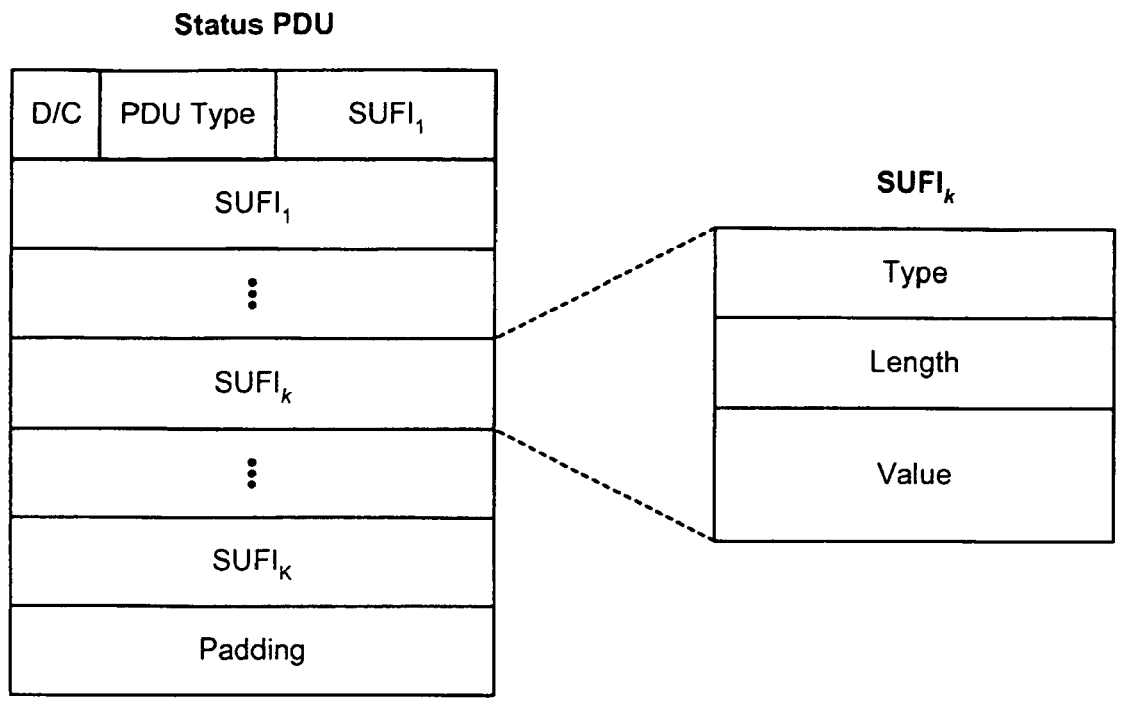
*FIG. 5A*
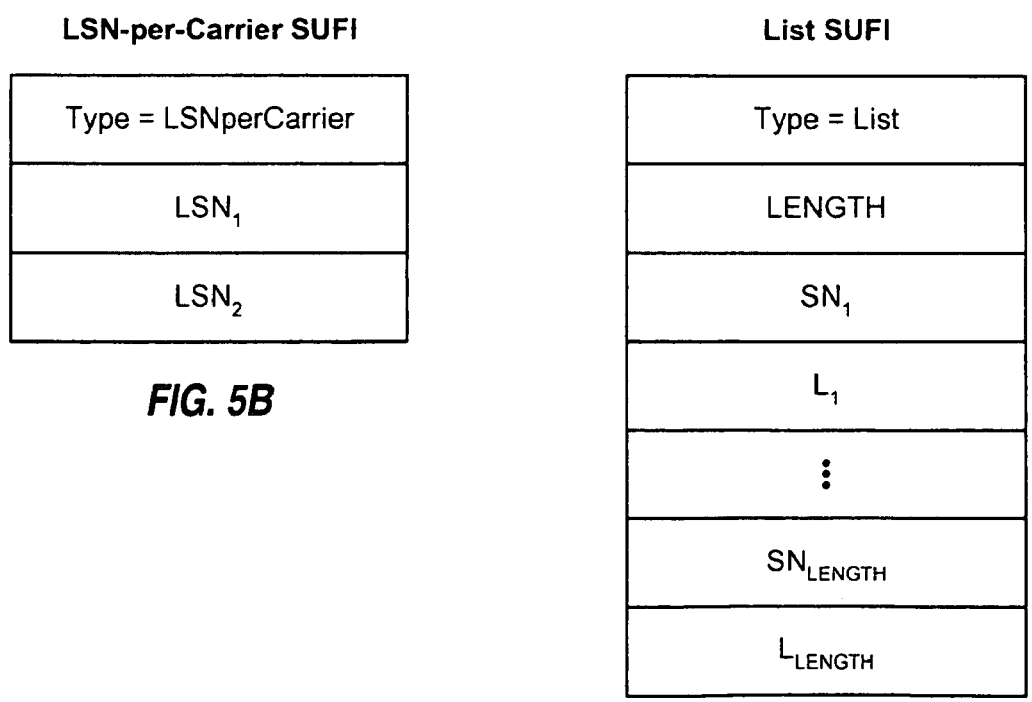
*FIG. 5B*
*FIG. 5C*

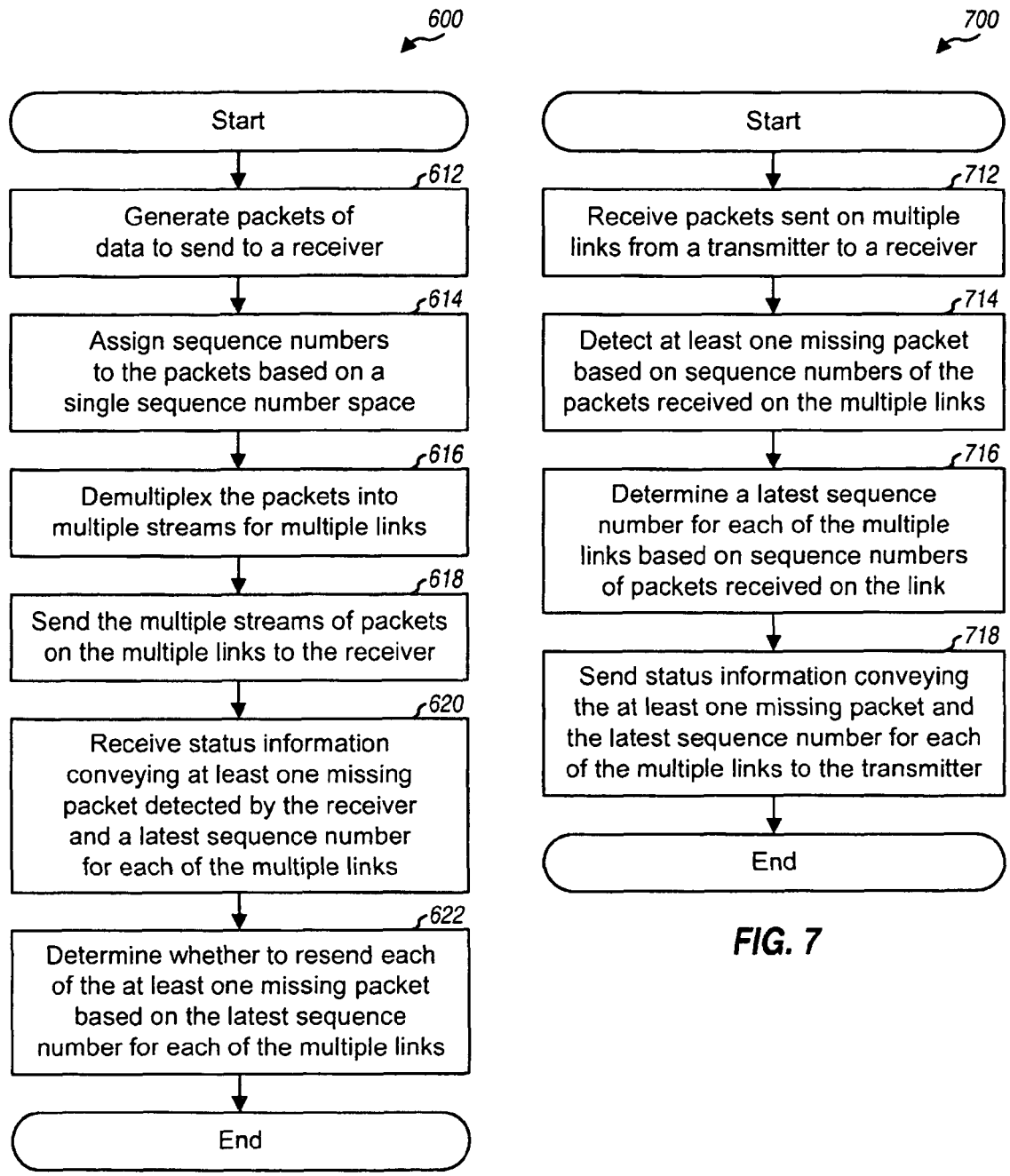

METHOD AND APPARATUS FOR LINK CONTROL IN A WIRELESS COMMUNICATION SYSTEM

The present application claims priority to provisional U.S. Application Ser. No. 61/031,612, entitled "METHOD AND APPARATUS FOR LINK CONTROL IN WIRELESS COMMUNICATIONS," filed Feb. 26, 2008 and provisional U.S. Application Ser. No. 61/075,452, entitled "METHOD AND APPARATUS FOR LINK CONTROL IN WIRELESS COMMUNICATIONS," filed Jun. 25, 2008, assigned to the assignee hereof and incorporated herein by reference.

BACKGROUND

I. Field

The present disclosure relates generally to communication, and more specifically to techniques for controlling data transmission in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of Node Bs that can support communication for a number of user equipments (UEs). A Node B may send packets of data to a UE and/or may receive packets from the UE. To increase transmission capacity, a transmitter (e.g., the Node B) may send packets on multiple links to a receiver (e.g., the UE). Each link may correspond to a different carrier, a different radio link, etc. The packets sent on different links may experience different delays due to various reasons. It is desirable to efficiently control transmission of packets on multiple links.

SUMMARY

Techniques for controlling transmission of packets on multiple links are described herein. A transmitter may generate packets of data for a receiver, assign the packets with sequence numbers from a single sequence number space, and demultiplex the packets (e.g., in bursts) into multiple streams for multiple links. The transmitter may queue the packets for each link separately and may send the packets on their associated links to the receiver. The receiver may receive some packets in error. The correctly received packets may be out of order due to (i) packet losses resulting from packets transmitted by the transmitter but received in error by the receiver and (ii) skew resulting from demultiplexing of packets in bursts and transmission delays on the multiple links.

In an aspect, the receiver may maintain a largest sequence number (LSN) of correctly received packets for each link. After detecting a sequence number gap with at least one missing packet, the receiver may send status information conveying the at least one missing packet and the largest sequence numbers for all links to the transmitter.

The transmitter may receive the status information from the receiver. The transmitter may maintain a mapping of which packets are being sent on each link. The transmitter may use the largest sequence numbers for all links from the status information as well as the packet-to-link mapping to determine whether to quickly resend each missing packet or wait. In one design, for each missing packet, the transmitter may determine the link to which the missing packet is mapped based on the packet-to-link mapping. The transmitter may also determine the largest sequence number for the link. If the sequence number of the missing packet is smaller than the largest sequence number for the link, then the transmitter may declare the missing packet as a lost packet (e.g., transmitted but received in error) and may quickly resend the missing packet. Otherwise, the transmitter may deem the missing packet to be delayed due to skew between the links and may wait for the missing packet to be sent in the normal manner. The transmitter may also start a timer for the missing packet due to skew and may send the missing packet when the timer expires.

Various aspects and features of the disclosure are described in further detail below.

BRIEF DESCRIPTION OF THE DRAWINGS

FIG. 5A shows a status protocol data unit (PDU).

FIGS. 5B and 5C show two super-fields (SUFIs) for the status PDU.

FIG. 6 shows a process for sending data in a wireless communication system.

FIG. 7 shows a process for receiving data in a wireless communication system.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE Advanced are new releases of UMTS that use E-UTRA. UTRA, E-UTRA, UMTS, LTE, LTE Advanced and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for WCDMA, and 3GPP terminology is used in much of the description below.

Figure 1:
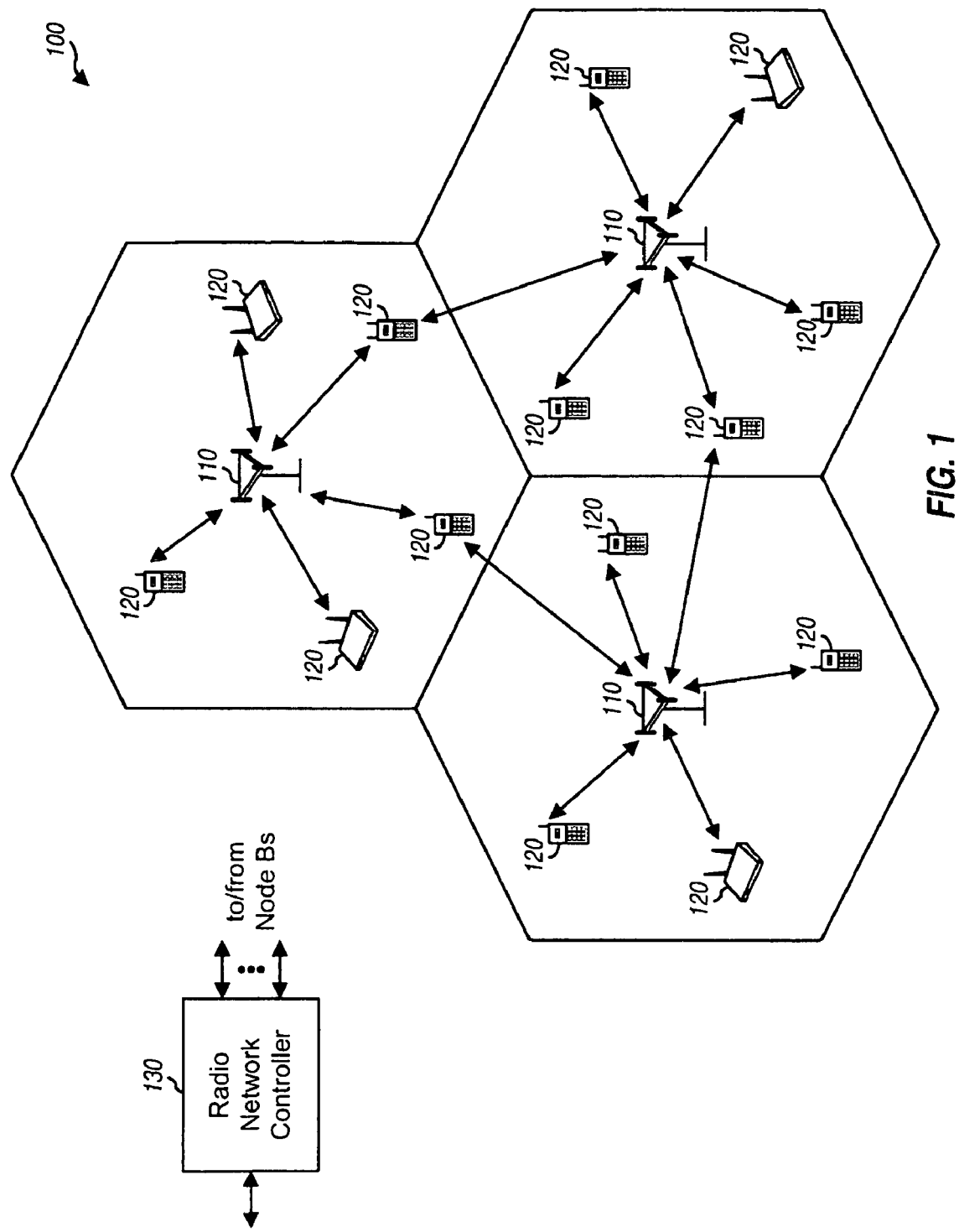
FIG. 1 shows a wireless communication system.

FIG. 1 shows a wireless communication system 100, which may include a number of Node Bs 110 and other network entities. A Node B may be a station that communicates with the UEs and may also be referred to as an evolved Node B (eNB), a base station, an access point, etc. Each Node B 110 provides communication coverage for a particular geographic area. To improve system capacity, the overall coverage area of a Node B may be partitioned into multiple (e.g., three) smaller areas. Each smaller area may be served by a respective Node B subsystem. In 3GPP, the term "cell" can refer to the smallest coverage area of a Node B and/or a Node B subsystem serving this coverage area. An RNC 130 may couple to a set of Node Bs 110 and provide coordination and control for these Node Bs.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with a Node B via the downlink and uplink. The downlink (or forward link) refers to the communication link from the Node B to the UE, and the uplink (or reverse link) refers to the communication link from the UE to the Node B.

The system may support data transmission on multiple links. In one design, the multiple links may correspond to multiple carriers. Each carrier may have a specific center frequency and a specific bandwidth and may be used to send traffic data, control information, pilot, etc. In another design, the multiple links may correspond to multiple radio links from different cells to a UE. In yet another design, the multiple links may correspond to different spatial channels obtained with multiple-input multiple-output (MIMO) transmission. The multiple links may also be obtained in other manners.

Figure 2:
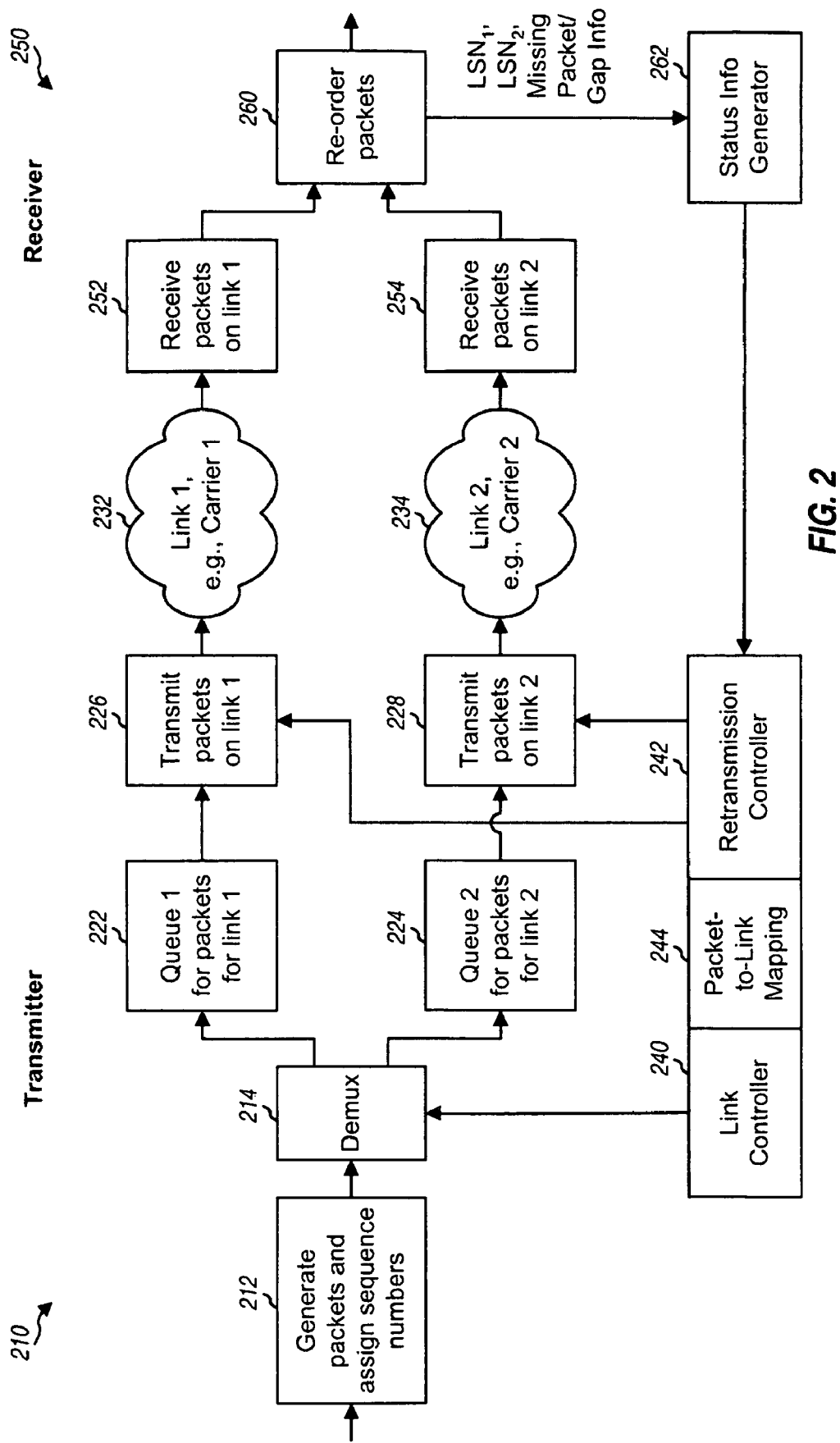
FIG. 2 shows data transmission from a transmitter to a receiver on two links.

FIG. 2 shows an exemplary data transmission from a transmitter 210 to a receiver 250 on two links 1 and 2, e.g., two carriers 1 and 2. For data transmission on the downlink, transmitter 210 may include a Node B and possibly an RNC, and receiver 250 may be a UE. For data transmission on the uplink, transmitter 210 may be a UE, and receiver 250 may include a Node B and possibly an RNC.

At transmitter 210, a unit 212 may receive incoming data for receiver 250, partition the data into packets, and assign a sequence number (SN) to each packet. The packets may be for Radio Link Control (RLC), Radio Link Protocol (RLP), Medium Access Control (MAC), etc. MAC is a protocol for a sublayer of a link layer (Layer 2) in a protocol stack. RLC and RLP are two protocols for a sublayer above MAC in the link layer. The sequence number may start at 0, may be incremented for each packet, and may wrap around to 0 after reaching a maximum value. For example, the maximum value may be equal to 4095 for a 12-bit sequence number. The sequence number may be used by receiver 250 for various purposes such as re-ordering, missing packet detection, etc.

A demultiplexer (Demux) 214 may receive packets from unit 212 and may provide each packet to either a queue 222 (or queue 1) for link 1 or a queue 224 (or queue 2) for link 2. The demultiplexing may be controlled by a link controller 240, which may maintain a mapping 244 of which packets are being sent on each link. Each queue may store its packets until they are ready for transmission. Link controller 240 may also maintain an association of each queue/stream with a link. A unit 226 may receive packets from queue 222, process (e.g., encode and modulate) each packet, and transmit the processed packets on link 1 (cloud 232). Similarly, a unit 228 may receive packets from queue 224, process each packet, and transmit the processed packets on link 2 (cloud 234).

At receiver 250, a unit 252 may receive packets on link 1, process (e.g., demodulate and decode) each received packet, and provide correctly received packets to a re-ordering unit 260. Similarly, a unit 254 may receive packets on link 2, process each received packet, and provide correctly received packets to re-ordering unit 260. Re-ordering unit 260 may re-order the correctly received packets based on their sequence numbers.

Re-ordering unit 260 may also identify missing packets. A missing packet is a packet that is not yet received correctly and has a sequence number that is earlier than a sequence number of a correctly received packet. Because of wrap-around, an earlier sequence number may have a larger value than a later sequence number, e.g., sequence number 4095 may be earlier than sequence number 0. The sequence number space may cover a range of 0 to K−1, where $K=2^B$ and B is the number of bits used for the sequence number. For a given sequence number k, a portion (e.g., half) of the sequence number space may be considered as earlier/smaller than k, and the remaining portion of the sequence number space may be considered as later/larger than k. For example, sequence numbers (k−L+K) mod K through (k−1) mod K may be considered as earlier/smaller than sequence number k, where "mod" denotes a modulo operation used to account for wrap-around. L may be defined as L=K/2, so that half of the sequence number space is earlier/smaller than k. In the description herein, a "largest sequence number" is a sequence number having a value that is latest among all sequence number values being considered. The largest sequence number may have a smaller value than that of another sequence number being considered due to wrap around. In the description herein, the terms "larger" and "later" may be used interchangeably, and the terms "smaller" and "earlier" may also be used interchangeably.

Re-ordering unit 260 may detect a sequence number gap whenever a missing packet is detected. The sequence number gap may cover one or more missing packets. Re-ordering unit 260 may provide sequence numbers of missing packets and other information. A unit 262 may generate and send status information for the sequence number gap to transmitter 210. A retransmission controller 242 at transmitter 210 may receive the status information from receiver 250 and may resend the missing packet(s) in the sequence number gap.

Units 212 to 244 within transmitter 210 may reside at one or more entities. For data transmission on the downlink in WCDMA, units 212, 214, 240, 242 and 244 may reside at an RNC, and units 222 to 228 may reside at a Node B. Units 212 to 244 may also reside at a base station for data transmission on the downlink in other systems. Units 212 to 244 may reside at a UE for data transmission on the uplink.

Units 252 to 262 within receiver 250 may also reside at one or more entities. For data transmission on the downlink, units 252 to 262 may reside at a UE. For data transmission on the uplink in WCDMA, units 252 and 254 may reside at a Node B, and units 260 and 262 may reside at an RNC. Units 252 to 262 may also reside at a base station for data transmission on the uplink in other systems.

Data transmission on multiple links may be supported by various radio technologies. For example, data transmission on multiple links may be supported by an acknowledged mode (AM) mode of RLC in Dual-Cell High-Speed Downlink Packet Access (DC HSDPA) in WCDMA. HSDPA is a set of channels and procedures that enable high-speed packet data transmission on the downlink. DC HSDPA is a version of HSDPA that supports data transmission on two carriers, which may be considered as two links. For DC HSDPA, an RNC may generate RLC packets for incoming data and may assign an RLC sequence number to each RLC packet. The RNC may demultiplex the RLC packets into two streams, one RLC packet stream for each link. However, the RNC may use the same RNC sequence number space for both streams. The RNC may send the two RLC packet streams to a Node B, which may maintain separate queues for the two links. The Node B may receive the two RLC packet streams from the RNC and may store the RLC packets in each stream in a corresponding queue. The Node B may send the RLC packets in each stream via a separate MAC flow on the associated link. The AM mode of RLC may assume in-order delivery of RLC packets from MAC. However, with two links in DC HSDPA, this assumption may not hold, and RLC packets may be received out of order on the two links. Out-of-order RLC packets may be addressed as described below.

Figure 3:
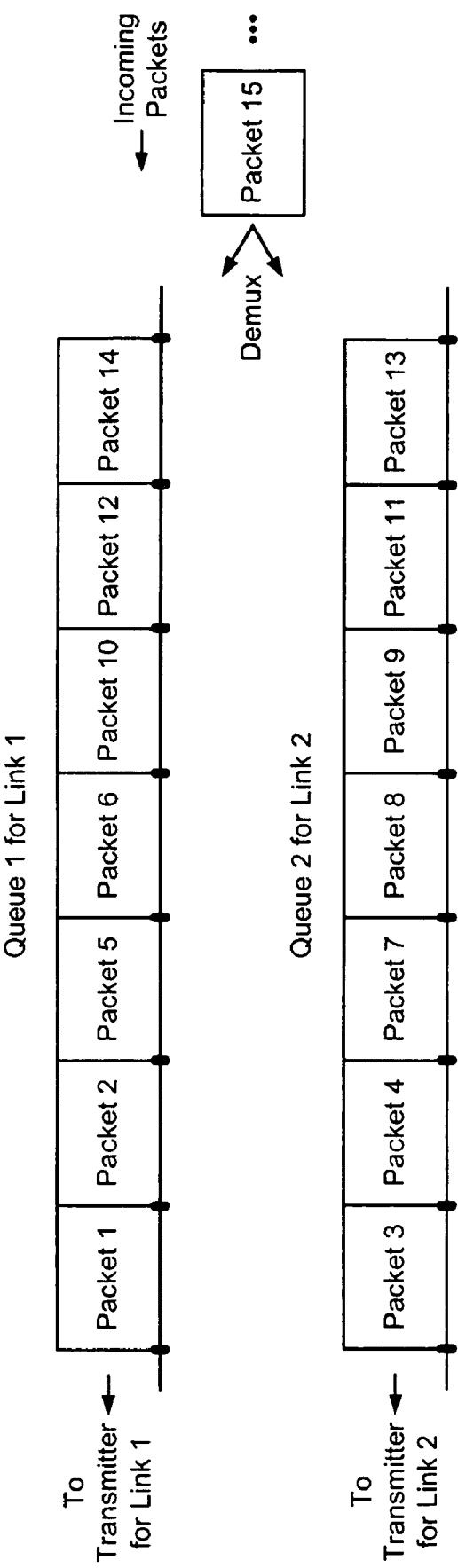
FIG. 3 shows an example of packet demultiplexing by the transmitter.

FIG. 3 shows an example of packet demultiplexing by the transmitter, e.g., an RNC. In this example, RLC packets are assigned sequence numbers 1, 2, 3, etc., with RLC packet n being an RLC packet assigned sequence number n. The RNC may demultiplex and forward RLC packets in batches to each queue at a Node B, e.g., as determined by link control on an Iub interface between the RNC and the Node B. In the example shown in FIG. 2, the RNC forwards RLC packets 1 and 2 to queue 1 for link 1, then RLC packets 3 and 4 to queue 2 for link 2, then RLC packets 5 and 6 to queue 1, etc.

The Node B may send the RLC packets in each queue on the associated link to a UE. The RLC packets in the two queues may observe different delays due to cell loading at the Node B, variations in channel conditions, etc. The RLC packets may thus arrive out of order at the UE.

The term "skew" may be used to refer to out-of-order packets across links. A skew may exist when there is a sequence number gap in the packets received on the multiple links due to demultiplexing in batches by the RNC and/or transmission delay by the Node B. In the example shown in FIG. 3, if RLC packets 1 and 3 are sent by the Node B and received correctly by the UE, then a sequence number gap with missing RLC packet 2 would exist. This sequence number gap would be due to a skew resulting from RLC packets 1 and 2 being provided in a batch to queue 1 for link 1.

A skew may be large due to demultiplexing of RLC packets in batches by the RNC, variable delay in forwarding the RLC packets from the RNC to the Node B, scheduling delay at the Node B for the RLC packets, variable delay in sending the RLC packets on the links to the UE, etc. A large skew may result in many sequence number gaps being detected by the UE and reported to the transmitter, e.g., the RNC and/or the Node B. For efficient retransmission, the transmitter should be able to distinguish between genuine packet losses and skew across links. Genuine packet losses may result from RLC packets being transmitted but received in error by the UE, RLC packets being dropped by the transmitter for whatever reason, etc. For genuine packet losses, the transmitter should resend the missing packets as quickly as possible. For skew across links, the transmitter may wait for the missing packets to be sent in the normal manner.

In an aspect, a receiver may maintain the largest sequence number (LSN) of correctly received packets for each link and may update the largest sequence number as packets are received on the link. The largest sequence number may also be referred to as the latest sequence number, etc. The receiver may send the largest sequence numbers for all links when reporting a sequence number gap and/or sending feedback information to a transmitter. The transmitter may maintain a mapping of which packets are being sent on each link. The transmitter may use the largest sequence numbers for all links as well as its packet-to-link mapping to determine whether each missing packet in the sequence number gap reported by the receiver is due to genuine packet loss or skew across links. The transmitter may take appropriate action depending on whether genuine packet loss or skew across links is detected.

Figure 4:
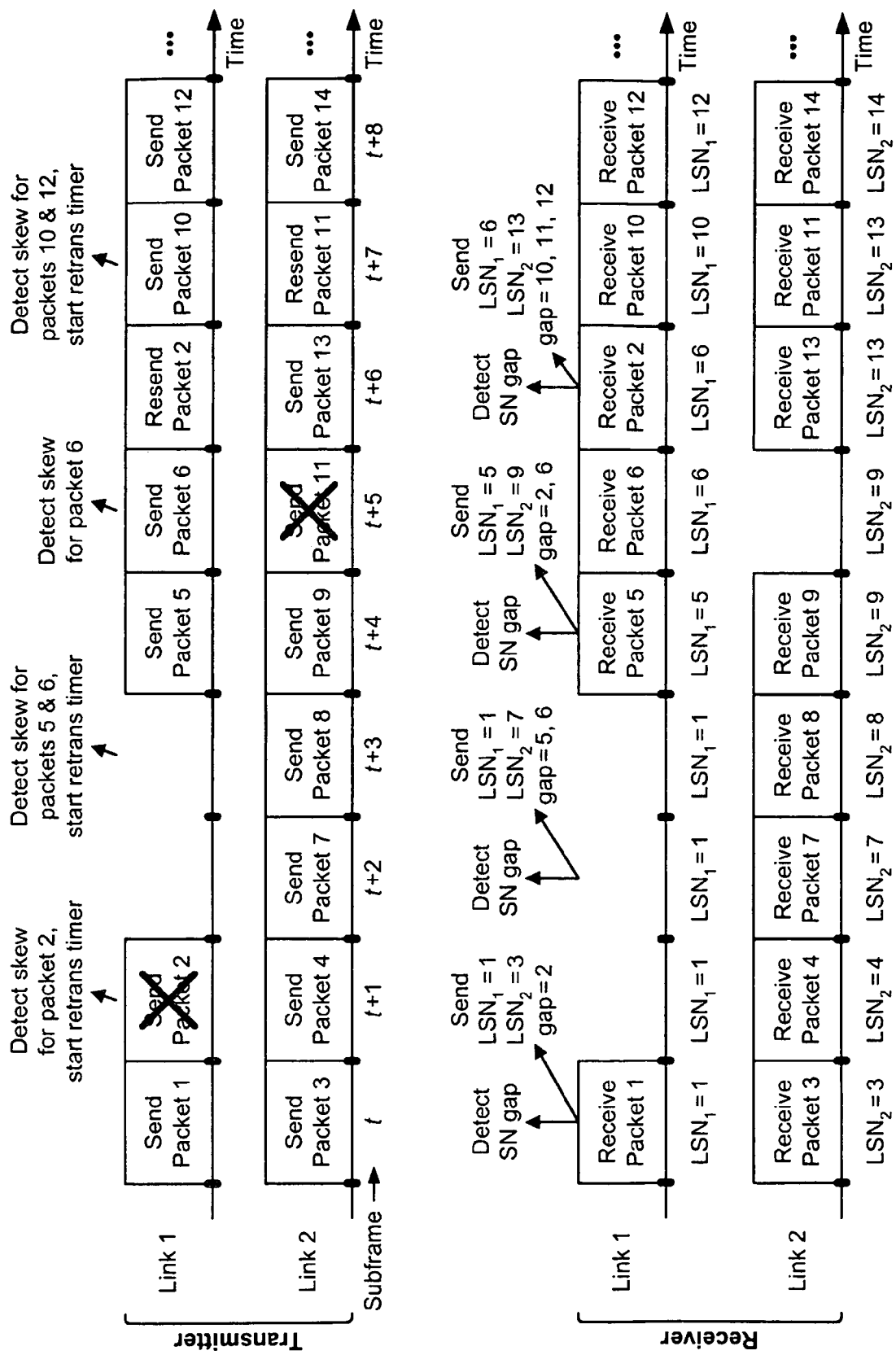
FIG. 4 shows an example of packet transmission by the transmitter and packet reception by the receiver.

FIG. 4 shows an example of packet transmission by the transmitter and packet reception by the receiver in accordance with one design. The transmission timeline may be partitioned into units of subframes. Each subframe may have a particular duration, e.g., 2 millisecond (ms), etc. A subframe may also be referred to as a slot, a frame, etc. In the example shown in FIG. 4, the transmitter may send an RLC packet on one link in one subframe and may send RLC packets for each link in the order in which they are generated and demultiplexed. The receiver may process (e.g., demodulate and decode) a received transmission on each link and may keep track of which RLC packets are received correctly on each link. For example, MAC at the receiver may perform decoding for each link and may pass correctly received RLC packets as well as the link on which each RLC packet was received up to RLC.

In the example shown in FIG. 4, in subframe t, the transmitter (e.g., the Node B) sends RLC packet 1 on link 1 and RLC packet 3 on link 2. The receiver (e.g., the UE) correctly receives RLC packets 1 and 3, sets the largest sequence number for link 1 ($LSN_1$) to 1, and sets the largest sequence number for link 2 ($LSN_2$) to 3. The receiver detects a sequence number (SN) gap with missing RLC packet 2 and sends status information comprising $LSN_1$ of 1, $LSN_2$ of 3, and missing RLC packet 2 to the transmitter. The transmitter receives the status information and deems that the sequence number gap is due to skew since (i) $LSN_1$ from the receiver indicates that RLC packet 1 is the latest RLC packet received on link 1 and (ii) the packet-to-link mapping at the transmitter indicates that RLC packet 2 is mapped to link 1 and thus has not been sent. The transmitter waits for missing RLC packet 2 to be sent in the normal manner.

In subframe t+1, the transmitter sends RLC packet 2 on link 1 and RLC packet 4 on link 2. The receiver receives RLC packet 2 in error but correctly receives RLC packet 4. The receiver then maintains $LSN_1$ at 1 and sets $LSN_2$ to 4.

In subframe t+2, the transmitter sends no RLC packets on link 1 and sends RLC packet 7 on link 2. The receiver correctly receives RLC packet 7, maintains $LSN_1$ at 1, and sets $LSN_2$ to 7. The receiver detects a sequence number gap with missing RLC packets 5 and 6 and sends status information comprising $LSN_1$ of 1, $LSN_2$ of 7, and missing RLC packets 2, 5 and 6 to the transmitter. The transmitter receives the status information and determines that missing RLC packets 2, 5 and 6 are mapped to link 1. The transmitter deems that missing RLC packets 2, 5 and 6 are due to skew since $LSN_1$ is 1 and thus waits for the missing RLC packets to be sent in the normal manner.

In subframe t+3, the transmitter sends no RLC packets on link 1 and sends RLC packet 8 on link 2. The receiver correctly receives RLC packet 8, maintains $LSN_1$ at 1, and sets $LSN_2$ to 8.

In subframe t+4, the transmitter sends RLC packet 5 on link 1 and sends RLC packet 9 on link 2. The receiver correctly receives RLC packets 5 and 9, sets $LSN_1$ to 5, and sets $LSN_2$ to 9. The receiver detects sequence number gaps with missing RLC packets 2 and 6 and sends status information comprising $LSN_1$ of 5, $LSN_2$ of 9, and missing RLC packets 2 and 6 to the transmitter. The transmitter receives the status information and determines that missing RLC packets 2 and 6 are mapped to link 1. The transmitter determines that missing RLC packet 2 is due to packet loss since $LSN_1$ is 5 and further deems that missing RLC packet 6 is due to skew since $LSN_1$ is 5. The transmitter then schedules retransmission of RLC packet 2 and waits for RLC packet 6 to be sent in the normal manner.

In subframe t+5, the transmitter sends RLC packet 6 on link 1 and sends RLC packet 11 on link 2. The receiver correctly receives RLC packet 6, receives RLC packet 11 in error, sets $LSN_1$ to 6, and maintains $LSN_2$ at 9.

In subframe t+6, the transmitter resends RLC packet 2 on link 1 and sends RLC packet 13 on link 2. The receiver correctly receives RLC packets 2 and 13, maintains $LSN_1$ at 6, and sets $LSN_2$ to 13. The receiver detects a sequence number gap with missing RLC packets 10 to 12 and sends status information comprising $LSN_1$ of 6, $LSN_2$ of 13, and missing RLC packets 10 to 12 to the transmitter. The transmitter receives the status information, determines that missing RLC packets 10 and 12 are mapped to link 1, and determines that missing RLC packet 11 is mapped to link 2. The transmitter deems that missing RLC packets 10 and 12 are due to skew since $LSN_1$ is 6 and determines that missing RLC packet 11 is due to packet loss since $LSN_2$ is 13. The transmitter then schedules retransmission of RLC packet 11 and waits for RLC packets 10 and 12 to be sent in the normal manner.

In subframe t+7, the transmitter sends RLC packet 10 on link 1 and resends RLC packet 11 on link 2. The receiver correctly receives RLC packets 10 and 11, sets $LSN_1$ to 10, and maintains $LSN_2$ at 13.

In subframe t+8, the transmitter sends RLC packet 12 on link 1 and sends RLC packet 14 on link 2. The receiver correctly receives RLC packets 12 and 14, sets $LSN_1$ to 12, and sets $LSN_2$ to 14. Data transmission by the transmitter and data reception by the receiver may continue in similar manner.

As shown by the example in FIG. 4, by reporting the largest sequence numbers for all links by the receiver, the transmitter may be able to distinguish between packet losses and skew. The transmitter may quickly schedule retransmission of missing packets due to packet losses and may wait for normal transmissions of missing packets due to skew. The receiver may send status information in various manners.

FIG. 5A shows a structure of a status PDU for RLC in WCDMA. The status PDU includes a 1-bit data/control (D/C) field, a 3-bit PDU Type field, one or more (K) super-fields (SUFIs), and a Padding field. The D/C field may be set to '1' for a control PDU or to '0' for a data PDU. The PDU Type field may be set to '000' for a status PDU or to some other value for other types of PDU. Each SUFI includes a Type sub-field, a Length sub-field, and a Value sub-field. The Type sub-field may be set to different values for different types of SUFI. The Length sub-field may be present and may indicate the length of the Value field. The Value field may carry information for the SUFI. The Padding field may include padding bits to make the status PDU an integer number of octets.

FIG. 5B shows a design of an LSN-per-Carrier SUFI, which can convey the largest sequence numbers for two carriers/links. In this design, the SUFI includes a Type sub-field, an $LSN_1$ sub-field, and an $LSN_2$ sub-field. The Type sub-field may be set to a reserved value for the LSN-per-Carrier SUFI. The $LSN_1$ sub-field may carry the largest sequence number among the sequence numbers of all RLC packets correctly received on link/carrier 1. The $LSN_2$ sub-field may carry the largest sequence number among the sequence numbers of all RLC packets correctly received on link/carrier 2. Each LSN sub-field may have the same size or length (e.g., 12 bits) as that of the sequence number. The LSN-per-Carrier SUFI may also include more than two LSN sub-fields for more than two links/carriers.

FIG. 5C shows a List SUFI in WCDMA. The List SUFI includes a Type sub-field, a Length sub-field, and LENGTH pairs of SN and L sub-fields. The Type sub-field may be set to '0011' for the List SUFI. The Length sub-field may be set to LENGTH, which may be any suitable value. For the i-th sub-field pair, where $1 \leq i \leq LENGTH$, the $SN_i$ sub-field may carry the sequence number of an RLC packet not received correctly, and the $L_i$ sub-field may be set to the number of consecutive RLC packets not received correctly following the RLC packet with $SN_i$.

A status PDU may include the LSN-per-Carrier SUFI in FIG. 5B (e.g., whenever two links are configured), the List SUFI in FIG. 5C, and possibly other SUFIs. In the example shown in FIG. 4, a status PDU may be sent after subframe t for the sequence number gap with missing RLC packet 2, after subframe t+2 for the sequence number gaps with missing RLC packets 2, 5 and 6, after subframe t+4 for the sequence number gaps with missing RLC packets 2 and 6, etc.

Referring back to FIG. 2, re-ordering unit 260 at receiver 250 may provide $LSN_1$, $LSN_2$ and missing packet/gap information whenever a sequence number gap is detected. Unit 262 may generate a status PDU with the $LSN_1$, $LSN_2$ and missing packet/gap information from unit 260 and may send the status PDU to transmitter 210.

At transmitter 210, retransmission controller 242 may receive the status PDU from receiver 250. Controller 242 may identify one or more missing RLC packets being reported in the status PDU and may treat each missing RLC packet as a separate sequence number gap. Controller 242 may associate each missing RLC packet with the link to which that RLC packet is mapped based on packet-to-link mapping 244. For each link, controller 242 may compare the sequence number of each missing RLC packet for that link with the reported LSN for the link. Each missing RLC packet with a sequence number earlier than the LSN may be deemed as a lost packet and may be retransmitted quickly. Each missing RLC packet with a sequence number later than the LSN may be deemed as being caused by skew.

In one design, transmitter 210 may start a retransmission timer upon detecting a missing packet due to skew. This retransmission timer may be referred to as a Retransmission-DelayTimer. For the example shown in FIG. 4, transmitter 210 may start a retransmission timer for RLC packet 2 upon receiving the status PDU in subframe t+1 and determining that missing RLC packet 2 is due to skew. Transmitter 210 may also start a retransmission timer for RLC packets 5 and 6 upon receiving the status PDU in subframe t+3 and determining that these missing RLC packets are due to skew. If a sequence number gap is not filled when its retransmission timer expires, then transmitter 210 may send the missing RLC packet(s) in the remaining gap. The retransmission timer may be set to a suitable value, which should be (i) large enough to reduce the number of spurious retransmissions of missing RLC packets due to skew but (ii) small enough to avoid long delays during changes in serving cell and de-allocations of links.

Transmitter 210 may resend a missing RLC packet due to packet loss or skew on the same link to which the RLC packet was forwarded originally. Transmitter 210 may also resend the missing RLC packet on a different link than the one to which the RLC packet was forwarded originally. A decision on whether to resend the missing RLC packet on the original link or another link may be made, e.g., based on link control between the RNC and the Node B.

The techniques described herein in combination with tight link control may improve performance of data transmission on multiple links. Tight link control may entail (i) forwarding packets in smaller batches to the queues for the multiple links in order to reduce skew and (ii) forwarding packets at a sufficiently fast rate to account for variations in the links. The techniques may allow the transmitter to distinguish between genuine packet losses and skew so that proper corrective action can be taken. A retransmission timer may be used to ensure timely transmission of missing packets due to skew.

FIG. 6 shows a design of a process 600 for sending data in a wireless communication system. Process 600 may be performed by a transmitter, which may be one or more network entities (e.g., an RNC and/or a Node B) for data transmission on the downlink, or a UE for data transmission on the uplink.

The transmitter may generate packets of data to send to a receiver (block 612). The packets may be RLC packets or packets for some other protocol. The transmitter may assign sequence numbers to the packets based on a single sequence number space, e.g., assign sequentially increasing sequence numbers to the packets (block 614). The transmitter may demultiplex the packets (e.g., in bursts of variable number of packets) into multiple streams for multiple links (block 616). The multiple links may correspond to multiple carriers, multiple radio links, etc., used for data transmission to the receiver. The transmitter may maintain a mapping of packets being sent on each link. The transmitter may send the multiple streams of packets on the multiple links to the receiver (block 618). The transmitter may maintain a separate queue for each stream of packets and may send the packets in each stream on the associated link, e.g., based on flow control for the link.

The transmitter may receive status information conveying at least one missing packet detected by the receiver and the largest sequence number for each of the multiple links (block 620). The largest sequence number for each link may be the largest/latest sequence number among the sequence numbers of all packets received on the link by the receiver. Each missing packet may be a packet that is not yet received by the receiver and has a sequence number that is smaller/earlier than a sequence number of a received packet at the receiver. The transmitter may determine whether to resend each of the at least one missing packet based on the largest sequence number for each of the multiple links (block 622).

In one design of block 620, the transmitter may receive a status PDU comprising a first SUFI and a second SUFI, e.g., as shown in FIG. 5A. The transmitter may obtain the largest sequence number for each link from the first SUFI, e.g., the LSN-per-Carrier SUFI in FIG. 5B. The transmitter may determine the at least one missing packet based on information in the second SUFI, e.g., the List SUFI in FIG. 5C. The transmitter may also receive the status information via other messages.

In one design of block 622, the transmitter may determine whether to resend each missing packet as follows. The transmitter may determine the link to which the missing packet is mapped. The transmitter may also determine the largest sequence number for the link from the status information. The transmitter may declare the missing packet as a lost packet and may quickly resend the missing packet if the sequence number of the missing packet is smaller/earlier than the largest sequence number for the link. Conversely, if the sequence number of the missing packet is larger/later than the largest sequence number for the link, then the transmitter may declare the missing packet to be due to skew and may start a timer. The transmitter may resend the missing packet when the timer expires and may cancel the timer after receiving an indication that the missing packet is received by the receiver. This indication may be provided via status information.

FIG. 7 shows a design of a process 700 for receiving data in a wireless communication system. Process 700 may be performed by a receiver, which may be a UE for data transmission on the downlink or one or more network entities (e.g., an RNC and/or a Node B) for data transmission on the uplink.

The receiver may receive packets on multiple links from a transmitter (block 712). Packets for the receiver may be assigned sequence numbers from a single sequence number space by the transmitter and may be demultiplexed in bursts for transmission on the multiple links to the receiver. The receiver may detect at least one missing packet based on sequence numbers of the packets received on the multiple links (block 714). In one design, the receiver may detect each packet not yet received by the receiver and having a sequence number smaller/earlier than a sequence number of a received packet as a missing packet.

The receiver may determine the largest sequence number for each of the multiple links based on the sequence numbers of packets received on the link (block 716). In one design, the receiver may update the largest sequence number for each link whenever a packet with a larger/later sequence number is received on the link. The packets received on the multiple links may be processed by MAC. MAC may pass each correctly received packet as well as the link on which the packet is received up to RLC in order to support determination of the largest sequence number for each link.

The receiver may send status information conveying the at least one missing packet and the largest sequence number for each of the multiple links to the transmitter (block 718). In one design, the receiver may determine a first SUFI (e.g., the LSN-per-Carrier SUFI in FIG. 5B) comprising the largest sequence number for each link. The receiver may also determine a second SUFI (e.g., the List SUFI in FIG. 5C) comprising information for the at least one missing packet. The receiver may then generate a status PDU comprising the first SUFI and the second SUFI and may send the status PDU to the transmitter. The receiver may also send the status information to the transmitter in other manners.

Figure 8:
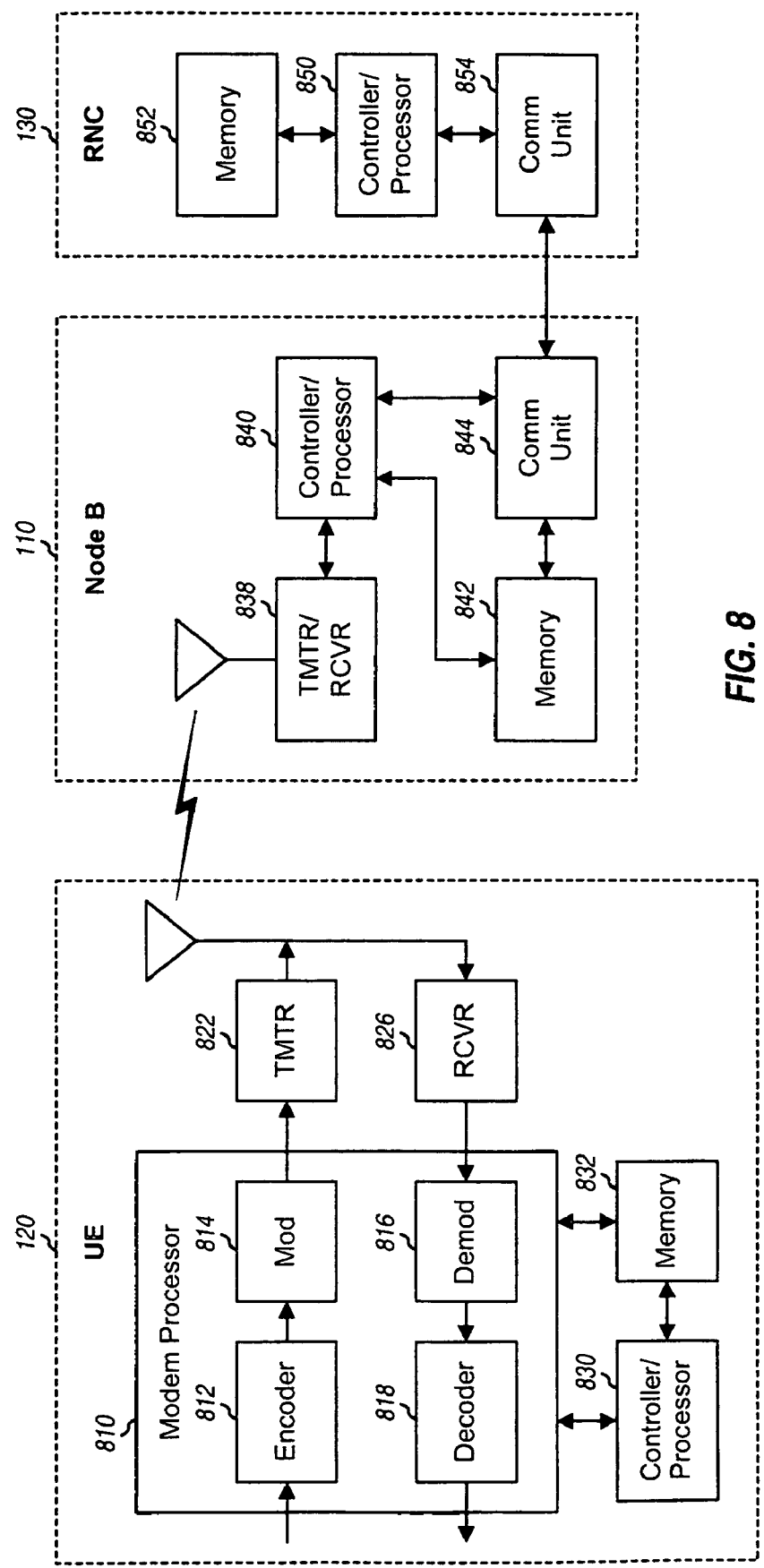
FIG. 8 shows a block diagram of a UE, a Node B, and a Radio Network Controller (RNC).

FIG. 8 shows a block diagram of a design of a UE 120, a Node B 110, and RNC 130. UE 120 may be one of the UEs in FIG. 1, and Node B 110 may be one of the Node Bs in FIG. 1.

At UE 120, an encoder 812 may receive traffic data and messages (e.g., status PDUs) to be sent by UE 120 on the uplink. Encoder 812 may process (e.g., encode and interleave) the traffic data and messages. A modulator (Mod) 814 may further process (e.g., modulate, channelize, and scramble) the encoded traffic data and messages and provide output samples. A transmitter (TMTR) 822 may condition (e.g., convert to analog, filter, amplify, and frequency upconvert) the output samples and generate an uplink signal, which may be transmitted to Node B 110.

On the downlink, UE 120 may receive a downlink signal transmitted by Node B 110. A receiver (RCVR) 826 may condition (e.g., filter, amplify, frequency downconvert, and digitize) a received signal and provide input samples. A demodulator (Demod) 816 may process (e.g., descramble, channelize, and demodulate) the input samples and provide symbol estimates. A decoder 818 may process (e.g., deinterleave and decode) the symbol estimates and provide decoded data and messages sent to UE 120. Encoder 812, modulator 814, demodulator 816 and decoder 818 may be implemented by a modem processor 810. These units may perform processing in accordance with the radio technology (e.g., WCDMA, cdma2000, LTE, etc.) used by the system. A controller/processor 830 may direct the operation of various units at UE 120. Processor 830 and/or other units at UE 120 may perform or direct process 600 in FIG. 6 for data transmission on the uplink, process 700 in FIG. 7 for data reception on the downlink, and/or other processes for the techniques described herein. Memory 832 may store program codes and data for UE 120.

At Node B 110, a transmitter/receiver 838 may support radio communication for UE 120 and other UEs. A controller/processor 840 may perform various functions for communication with the UEs. For the uplink, the uplink signal from UE 120 may be received and conditioned by receiver 838 and further processed by controller/processor 840 to recover the traffic data and messages sent by the UE. For the downlink, traffic data and messages may be processed by controller/processor 840 and conditioned by transmitter 838 to generate a downlink signal, which may be transmitted to UE 120 and other UEs. Processor 840 and/or other units at Node B 110 may perform all or part of the process 600 in FIG. 6 for data transmission on the downlink, all or part of process 700 in FIG. 7 for data reception on the uplink, and/or other processes for the techniques described herein. Memory 842 may store program codes and data for the Node B. A communication (Comm) unit 844 may support communication with RNC 130 and/or other network entities.

At RNC 130, a controller/processor 850 may perform various functions to support communication services for the UEs. Processor 850 and/or other units at RNC 130 may perform all or part of the process 600 in FIG. 6 for data transmission on the downlink, process 700 in FIG. 7 for data reception on the uplink, and/or other processes for the techniques described herein. Memory 852 may store program codes and data for RNC 130. A communication unit 854 may support communication with the Node Bs and other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of sending data in a wireless communication system, comprising:

generating packets of data to send to a receiver;

assigning sequence numbers to the packets based on a single sequence number space;
demultiplexing the packets into multiple streams for multiple links;
sending the multiple streams of packets on the multiple links to the receiver;
receiving status information conveying at least one missing packet detected by the receiver and a largest sequence number for each of the multiple links, the largest sequence number for each link being a largest sequence number among sequence numbers of packets received on the link by the receiver; and
determining whether to resend each of the at least one missing packet based on the largest sequence number for each of the multiple links, comprising:
starting a timer if the sequence number of the missing packet is larger than the largest sequence number for the link, and
resending the missing packet when the timer expires.

2. The method of claim 1, wherein the demultiplexing the packets comprises demultiplexing the packets in bursts of variable number of packets to the multiple streams.

3. The method of claim 1, wherein the sending the multiple streams of packets comprises
queuing each stream of packets separately, and
sending the packets in each stream on a respective link.

4. The method of claim 1, further comprising:
maintaining a mapping of packets being sent on each link, and wherein whether to resend each of the at least one missing packet is determined based further on the mapping.

5. The method of claim 1, wherein the determining whether to resend each of the at least one missing packet comprises, for each missing packet,
determining a link to which the missing packet is mapped,
determining the largest sequence number for the link from the status information, and
resending the missing packet if a sequence number of the missing packet is smaller than the largest sequence number for the link.

6. The method of claim 1, wherein the determining whether to resend each of the at least one missing packet further comprises canceling the timer after receiving an indication that the missing packet is received by the receiver.

7. The method of claim 1, wherein the receiving status information comprises receiving a status protocol data unit (PDU) comprising a first super-field (SUFI) and a second SUFI,
obtaining the largest sequence number for each of the multiple links from the first SUFI, and
determining the at least one missing packet based on information in the second SUFI.

8. The method of claim 1, wherein the multiple links correspond to multiple carriers or multiple radio links used for data transmission to the receiver.

9. The method of claim 1, wherein the multiple links correspond to multiple radio links from different cells in the wireless communication system.

10. An apparatus for wireless communication, comprising:
at least one processor configured to:
generate packets of data to send to a receiver,
assign sequence numbers to the packets based on a single sequence number space,
demultiplex the packets into multiple streams for multiple links, to send the multiple streams of packets on the multiple links to the receiver,
receive status information conveying at least one missing packet detected by the receiver and a largest sequence number for each of the multiple links,
determine whether to resend each of the at least one missing packet based on the largest sequence number for each of the multiple links,
start a timer if the sequence number of the missing packet is larger than the largest sequence number for the link, and
resend the missing packet when the timer expires.

11. The apparatus of claim 10, wherein the at least one processor is configured to demultiplex the packets in bursts of variable number of packets to the multiple streams, to queue each stream of packets separately, and to send the packets in each stream on a respective link.

12. The apparatus of claim 10, wherein the at least one processor is configured to maintain a mapping of packets being sent on each link, and to determine whether to resend each of the at least one missing packet based further on the mapping.

13. The apparatus of claim 10, wherein for each missing packet the at least one processor is configured to determine a link to which the missing packet is mapped, to determine the largest sequence number for the link from the status information, and to resend the missing packet if a sequence number of the missing packet is smaller than the largest sequence number for the link.

14. The apparatus of claim 10, wherein the at least one processor is configured to receive a status protocol data unit (PDU) comprising a first super-field (SUFI) and a second SUFI, to obtain the largest sequence number for each of the multiple links from the first SUFI, and to determine the at least one missing packet based on information in the second SUFI.

15. A method of receiving data in a wireless communication system, comprising:
receiving packets sent on multiple links from a transmitter to a receiver;
detecting at least one missing packet based on sequence numbers of the packets received on the multiple links;
determining a largest sequence number for each of the multiple links based on sequence numbers of packets received on the link;
sending status information conveying the at least one missing packet and the largest sequence number for each of the multiple links to the transmitter; and
receiving one or more of the at least one missing packet after a time period corresponding to expiration of a timer set based on a sequence number of one or more of the at least one missing packets being larger than the largest sequence number for a corresponding one of the multiple links.

16. The method of claim 15, wherein packets for the receiver are assigned sequence numbers from a single sequence number space by the transmitter and are demultiplexed in bursts for transmission on the multiple links to the receiver.

17. The method of claim 15, wherein the detecting at least one missing packet comprises detecting each packet not yet received by the receiver and having a sequence number smaller than a sequence number of a received packet as a missing packet.

18. The method of claim 15, wherein the determining a largest sequence number for each of the multiple links comprises updating the largest sequence number for each link whenever a packet with a larger sequence number is received on the link.

19. The method of claim 18, wherein the determining a largest sequence number for each of the multiple links further comprises
   processing the packets received on the multiple links at Medium Access Control (MAC), and
   passing each received packet and a link on which the packet is received up to Radio Link Control (RLC).

20. The method of claim 15, wherein the sending status information comprises
   determining a first super-field (SUFI) comprising the largest sequence number for each of the multiple links,
   determining a second SUFI comprising information for the at least one missing packet,
   generating a status protocol data unit (PDU) comprising the first SUFI and the second SUFI, and
   sending the status PDU to the transmitter.

21. An apparatus for wireless communication, comprising:
   at least one processor configured to:
      receive packets sent on multiple links from a transmitter to a receiver,
      detect at least one missing packet based on sequence numbers of the packets received on the multiple links,
      determine a largest sequence number for each of the multiple links based on sequence numbers of packets received on the link,
      send status information conveying the at least one missing packet and the largest sequence number for each of the multiple links to the transmitter; and
      receive one or more of the at least one missing packet after a time period corresponding to expiration of a timer set based on a sequence number of one or more of the at least one missing packets being larger than the largest sequence number for a corresponding one of the multiple links.

22. The apparatus of claim 21, wherein the at least one processor is configured to detect each packet not yet received by the receiver and having a sequence number smaller than a sequence number of a received packet as a missing packet.

23. The apparatus of claim 21, wherein the at least one processor is configured to update the largest sequence number for each link whenever a packet with a larger sequence number is received on the link.

24. The apparatus of claim 21, wherein the at least one processor is configured to determine a first super-field (SUFI) comprising the largest sequence number for each of the multiple links, to determine a second SUFI comprising information for the at least one missing packet, to generate a status protocol data unit (PDU) comprising the first SUFI and the second SUFI, and to send the status PDU to the transmitter.

25. An apparatus for wireless communication, comprising:
   means for receiving packets sent on multiple links from a transmitter to a receiver;
   means for detecting at least one missing packet based on sequence numbers of the packets received on the multiple links;
   means for determining a largest sequence number for each of the multiple links based on sequence numbers of packets received on the link;
   means for sending status information conveying the at least one missing packet and the largest sequence number for each of the multiple links to the transmitter;
   means for receiving one or more of the at least one missing packet after a time period corresponding to expiration of a timer set based on a sequence number of one or more of the at least one missing packets being larger than the largest sequence number for a corresponding one of the multiple links.

26. The apparatus of claim 25, wherein the means for detecting at least one missing packet comprises means for detecting each packet not yet received by the receiver and having a sequence number smaller than a sequence number of a received packet as a missing packet.

27. The apparatus of claim 25, wherein the means for determining a largest sequence number for each of the multiple links comprises means for updating the largest sequence number for each link whenever a packet with a larger sequence number is received on the link.

28. The apparatus of claim 25, wherein the means for sending status information comprises
   means for determining a first super-field (SUFI) comprising the largest sequence number for each of the multiple links,
   means for determining a second SUFI comprising information for the at least one missing packet,
   means for generating a status protocol data unit (PDU) comprising the first SUFI and the second SUFI, and
   means for sending the status PDU to the transmitter.

29. A computer program product, comprising:
   a non-transitory computer-readable medium comprising:
   code for causing at least one computer to receive packets sent on multiple links from a transmitter to a receiver,
   code for causing the at least one computer to detect at least one missing packet based on sequence numbers of the packets received on the multiple links,
   code for causing the at least one computer to determine a largest sequence number for each of the multiple links based on sequence numbers of packets received on the link,
   code for causing the at least one computer to send status information conveying the at least one missing packet and the largest sequence number for each of the multiple links to the transmitter; and
   code for causing the at least one computer to receive one or more of the at least one missing packet after a time period corresponding to expiration of a timer set based on a sequence number of one or more of the at least one missing packets being larger than the largest sequence number for a corresponding one of the multiple links.

30. At least one processor for receiving data in a wireless communication system, comprising:
   a first module for receiving packets sent on multiple links from a transmitter to a receiver;
   a second module for detecting at least one missing packet based on sequence numbers of the packets received on the multiple links;
   a third module for determining a largest sequence number for each of the multiple links based on sequence numbers of packets received on the link;
   a fourth module for sending status information conveying the at least one missing packet and the largest sequence number for each of the multiple links to the transmitter; and
   a fifth module for receiving one or more of the at least one missing packet after a time period corresponding to expiration of a timer set based on a sequence number of one or more of the at least one missing packets being larger than the largest sequence number for a corresponding one of the multiple links.

31. An apparatus for sending data in a wireless communication system, comprising:
   means for generating packets of data to send to a receiver;
   means for assigning sequence numbers to the packets based on a single sequence number space;

means for demultiplexing the packets into multiple streams for multiple links;

means for sending the multiple streams of packets on the multiple links to the receiver;

means for receiving status information conveying at least one missing packet detected by the receiver and a largest sequence number for each of the multiple links, the largest sequence number for each link being a largest sequence number among sequence numbers of packets received on the link by the receiver; and means for determining whether to resend each of the at least one missing packet based on the largest sequence number for each of the multiple links, further comprising:

means for starting a timer if the sequence number of the missing packet is larger than the largest sequence number for the link, and means for resending the missing packet when the timer expires.

32. The apparatus of claim 21, wherein the means for demultiplexing the packets further comprises:

means for demultiplexing the packets in bursts of variable number of packets to the multiple streams;

means for queuing each stream of packets separately; and means for sending the packets in each stream on a respective link.

33. The apparatus of claim 31, further comprising:

means for maintaining a mapping of packets being sent on each link; and means for determining whether to resend each of the at least one missing packet based further on the mapping.

34. The apparatus of claim 31, wherein for each of the at least one missing packet, the means for determining whether to resend further comprises:

means for determining a link to which the missing packet is mapped;

means for determining the largest sequence number for the link from the status information; and means for resending the missing packet if a sequence number of the missing packet is smaller than the largest sequence number for the link.

35. The apparatus of claim 31, further comprising:

means for receiving a status protocol data unit (PDU) comprising a first super-field (SUFI) and a second SUFI;

means for obtaining the largest sequence number for each of the multiple links from the first SUFI; and means for determining the at least one missing packet based on information in the second SUFI.

36. A computer program product for sending data in a wireless communication system, comprising:

a non-transitory computer-readable medium comprising:

code for causing at least one computer to generate packets of data to send to a receiver;

code for causing the at least one computer to assign sequence numbers to the packets based on a single sequence number space;

code for causing the at least one computer to demultiplex the packets into multiple streams for multiple links, to send the multiple streams of packets on the multiple links to the receiver;

code for causing the at least one computer to receive status information conveying at least one missing packet detected by the receiver and a largest sequence number for each of the multiple links; and code for causing the at least one computer to determine whether to resend each of the at least one missing packet based on the largest sequence number for each of the multiple links, including:

code for causing the at least one computer to start a timer if the sequence number of the missing packet is larger than the largest sequence number for the link; and code for causing the at least one computer to resend the missing packet when the timer expires.

37. At least one processor configured to send data in a wireless communication system, comprising:

a first module for generating packets of data to send to a receiver;

a second module for assigning sequence numbers to the packets based on a single sequence number space;

a third module for demultiplexing the packets into multiple streams for multiple links;

a fourth module for sending the multiple streams of packets on the multiple links to the receiver;

a fifth module for receiving status information conveying at least one missing packet detected by the receiver and a largest sequence number for each of the multiple links, the largest sequence number for each link being a largest sequence number among sequence numbers of packets received on the link by the receiver; and a sixth module for determining whether to resend each of the at least one missing packet based on the largest sequence number for each of the multiple links, wherein the sixth module is further for:

starting a timer if the sequence number of the missing packet is larger than the largest sequence number for the link, and resending the missing packet when the timer expires.

* * * * *